T. TEMPLIN.
SEED-DROPPER.

No. 176,708. Patented April 25, 1876.

WITNESSES:
P. C. Dieterich.
H. C. McArthur.

INVENTOR:
Thomas Templin.
By: J. H. Alexander,
Attorney.

UNITED STATES PATENT OFFICE.

THOMAS TEMPLIN, OF HILLSBOROUGH, OHIO.

IMPROVEMENT IN SEED-DROPPERS.

Specification forming part of Letters Patent No. 176,708, dated April 25, 1876; application filed January 10, 1876.

*To all whom it may concern:*

Be it known that I, THOMAS TEMPLIN, of Hillsborough, in the county of Highland and State of Ohio, have invented certain new and useful Improvements in Seed-Droppers; and I do hereby declare that the following is a full, clear, and exact description thereof, reference being had to the accompanying drawings, and to the letters of reference marked thereon, which form part of this specification.

The nature of my invention consists in the construction and arrangement of a seed-planter to be attached to the axle of the sulky corn-plow now ordinarily in use, as will be hereinafter more fully set forth.

In order to enable others skilled in the art to which my invention appertains to make and use the same I will now proceed to describe its construction and operation, referring to the annexed drawing, in which—

Figure 1:
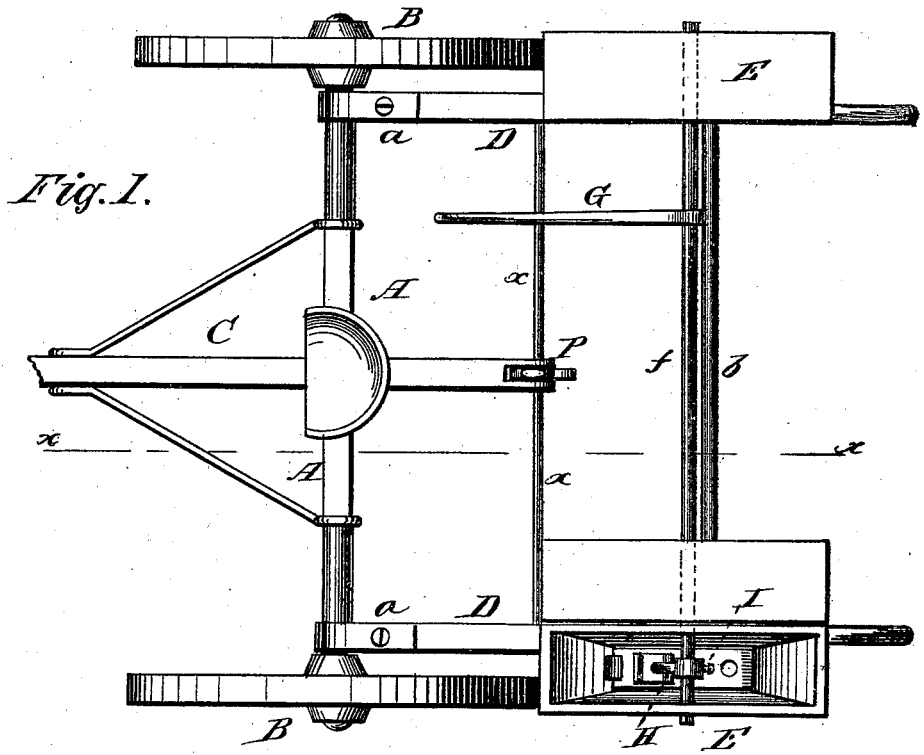
Figure 2:
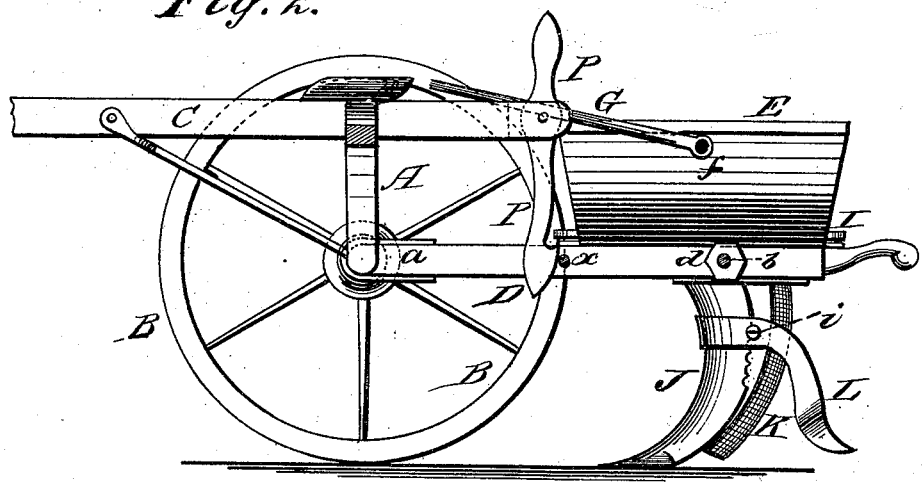

Figure 1 is a plan view, and Fig. 2 is a central vertical section on line *x x*, Fig. 1.

A represents the usual arched axle of the ordinary sulky corn-plow, with wheels B B and tongue C. D D are two straight bars of wood with iron stirrups *a* at their front ends fitted over the axle A, and bolted to said bars. On the rear portions of the bars D are secured the seed-boxes E, and the bars are adjusted at any distance apart by means of a rod, *b*, passing through them and having nuts *d* on its ends, so that the machine can be set to drop the corn in rows any width desired. Through the top of the two grain-boxes E E passes a rod, *f*, provided with a lever, G, extending near the driver's seat for the driver to rock said rod back and forth. Within each box E, on the rod *f*, is secured an arm or lever, H, the lower end of which is connected with the dropping-slide I in the bottom of the box. The arms or levers H are for the double purpose of shaking up the grain in the boxes and for operating the slides I. Under each box E is secured the furrow-opener J, and tube K behind the same, through which latter the seed is dropped into the ground. To each furrow-opener are attached the two coverers L L, which are formed of one piece of metal bent in the center around the front of the furrow-opener and fastened by a bolt, *i*, behind the same in a notch cut in the rear edge thereof, by which means the coverers may be set to suit the condition of the ground either deep or shallow. In the rear end of the tongue C is pivoted a lever-hook, P, for the purpose of catching on a rod, *x*, in the beams D D, and lifting the machine out of ground while turning at the ends of the rows or driving from one field to another.

Having thus fully described my invention, what I claim as new, and desire to secure by Letters Patent, is—

1. The combination of the furrow-opener J, provided with a series of notches in its rear edges, and the double coverer L, formed of a single piece of metal and adjustably held to the opener J by a single cross-bolt, *i*, resting in the notches in the rear of the opener, substantially as herein set forth.

2. The combination, with the axle A, of the bars D D, carrying the seed-boxes, hinged to the axle and provided with a connecting-rod, *x*, and the lever-hook P pivoted to the rear extension of the tongue C, all constructed substantially as and for the purposes herein set forth.

In testimony that I claim the foregoing as my own I affix my signature in presence of two witnesses.

THOMAS TEMPLIN.

Witnesses:
W. T. GREUBER,
P. WINEGARDNER.